United States Patent
Wang et al.

(10) Patent No.: US 11,002,297 B2
(45) Date of Patent: *May 11, 2021

(54) METHOD TO AUTOMATICALLY DETECT PARAMETER FOR PRESSURE DYNAMICS CONTROL

(71) Applicant: Eaton Intelligent Power Limited, Dublin (IE)

(72) Inventors: Meng Wang, Eden Prairie, MN (US); Michael Berne Rannow, Eden Prairie, MN (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,450

(22) Filed: Mar. 30, 2020

(65) Prior Publication Data

US 2020/0291970 A1  Sep. 17, 2020

Related U.S. Application Data

(63) Continuation of application No. 15/808,212, filed on Nov. 9, 2017, now Pat. No. 10,605,277.

(Continued)

(51) Int. Cl.
  *F15B 19/00* (2006.01)
  *F15B 11/00* (2006.01)
  (Continued)

(52) U.S. Cl.
  CPC .......... *F15B 19/002* (2013.01); *F15B 11/006* (2013.01); *F15B 13/0402* (2013.01); *F15B 13/0442* (2013.01); *F15B 19/00* (2013.01); *F15B 19/005* (2013.01); *F15B 21/02* (2013.01); *F15B 21/085* (2013.01); *F15B 21/087* (2013.01); *F15B 11/08* (2013.01); *F15B 13/0417* (2013.01); *F15B 19/007* (2013.01); *F15B 2013/0409* (2013.01); *F15B 2211/20546* (2013.01); *F15B 2211/30575* (2013.01); *F15B 2211/455* (2013.01); *F15B 2211/46* (2013.01);
  (Continued)

(58) Field of Classification Search
  CPC ......... F15B 19/00; F15B 19/005; F15B 21/02
  See application file for complete search history.

(56) References Cited

U.S. PATENT DOCUMENTS

2018/0128607 A1  5/2018  Wang et al.

OTHER PUBLICATIONS

Jain, K. et al., "Intercomparison of the effective areas of a pneumatic piston gauge determined by different techniques," Measurement Science and Technology, vol. 4, pp. 249-257 (1993).

*Primary Examiner* — Jamel E Williams
(74) *Attorney, Agent, or Firm* — Merchant & Gould P.C.

(57) ABSTRACT

Systems and methods for auto-commissioning first and second valve assemblies associated with an actuator in an electro-hydraulic system are disclosed. In one method, a controller performs an automatic test protocol to determine a bulk modulus over fluid volume parameter used by the controller to control the valve assemblies. In one aspect, the test protocol can include pressurizing each side of the actuator to two different pressures with one of the first and second valve assemblies and blocking the other side of the actuator with the other of the first and second valve assemblies. The bulk modulus over fluid volume parameter for each valve assembly can be calculated based on recorded fluid pressures at the actuator and consumed flow at the first and second valve assemblies.

13 Claims, 8 Drawing Sheets

Related U.S. Application Data (60) Provisional application No. 62/419,537, filed on Nov. 9, 2016, provisional application No. 62/419,540, filed on Nov. 9, 2016, provisional application No. 62/419,569, filed on Nov. 9, 2016.

(51) Int. Cl.
*F15B 13/04* (2006.01)
*F15B 13/044* (2006.01)
*F15B 21/02* (2006.01)
*F15B 21/08* (2006.01)
*F15B 11/08* (2006.01)
*F16K 37/00* (2006.01)
*G01F 1/36* (2006.01)
*G01F 15/00* (2006.01)

(52) U.S. Cl.
CPC .. *F15B 2211/634* (2013.01); *F15B 2211/6313* (2013.01); *F15B 2211/6346* (2013.01); *F15B 2211/6656* (2013.01); *F15B 2211/7053* (2013.01); *F15B 2211/7058* (2013.01); *F15B 2211/761* (2013.01); *F15B 2211/855* (2013.01); *F15B 2211/857* (2013.01); *F15B 2211/87* (2013.01); *F16K 37/00* (2013.01); *G01F 1/36* (2013.01); *G01F 15/005* (2013.01)

| | Bulk modulus over fluid volume | |
|---|---|---|
| | $\beta/V_1$ | $\beta/V_2$ |
| True | 1.6e10 | 4.8e10 |
| Estimation | 1.4e10 | 4.5e10 |
| Est. error [%] | 12.5% | 6.25% |

METHOD TO AUTOMATICALLY DETECT PARAMETER FOR PRESSURE DYNAMICS CONTROL

RELATED APPLICATIONS

This application is a continuation application of U.S. application Ser. No. 15/808,212, filed Nov. 9, 2017, now U.S. Pat. No. 10,605,277. U.S. application Ser. No. 15/808,212 claims priority to U.S. Provisional Patent Application Ser. No. 62/419,537, filed on Nov. 9, 2016; U.S. Provisional Patent Application Ser. No. 62/419,540, filed on Nov. 9, 2016; and, U.S. Provisional Patent Application Ser. No. 62/419,569, filed on Nov. 9, 2016, each of which is incorporated herein by reference. A claim of priority, to the extent appropriate, is made to each of the above referenced matters.

BACKGROUND

Work machines, such as off-highway vehicles, fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. Electro-hydraulic valves often rely on sensed values, such as port pressure and/or valve position to provide a stable, controlled flow to and from a hydraulic actuator, such as a linear actuator or motor. To accurately control such valves, fluid properties must generally be input into the control system.

SUMMARY

The disclosure includes a proposed method and auto-commissioning procedure to automatically detect the "bulk modulus over fluid volume" parameter of the actuator attached to the advanced mobile valve by performing an automated test. The advanced mobile valve includes of a pair of three position, three way independent metering valves. Each valve is equipped with valve spool position sensor, and pressure sensors at its work port. In addition, the valve can also measure the flow crossing it. The valve has signal processing/calculation capabilities. The auto-commissioning test does not require additional sensors or ECUs (no hardware is required). Additionally, the auto-commissioning test reduces set-up time and allows for the attachment of unknown implements to the actuator without requiring operator input. This test also improves valve control, particularly in the pressure control mode.

In one example, an auto-commissioning method for determining a bulk modulus over fluid volume parameter for a valve controller includes the steps of: providing first and second valve assemblies having at least one of a pressure sensor and a position sensor in communication with an electronic system controller, the valve assemblies being in fluid communication with the hydraulic actuator; pressurizing each side of the actuator to two different pressures with one of the first and second valve assemblies and blocking the other side of the actuator with the other of the first and second valve assemblies; and calculating the bulk modulus over fluid volume parameter for the first and second valves based on fluid pressure at the actuator and consumed flow at the first and second valve assemblies.

In one example, a method for determining a bulk modulus over fluid volume parameter for a valve controller includes the steps of: providing first and second valve assemblies, each valve assembly having at least one of a pressure sensor and a position sensor in communication with an electronic system controller, the valve assemblies being in fluid communication with the hydraulic actuator; holding the second valve in a closed position; opening the first valve for a first time period and then closing the first valve; recording time period, fluid pressure, and consumed flow for the first valve; opening the first valve for a second time period and then closing the first valve; recording time period, fluid pressure, and consumed flow for the first valve; holding the first valve in a closed position; opening the second valve for a first time period and then closing the second valve; recording time period, fluid pressure, and consumed flow for the second valve; opening the second valve for a second time period and then closing the second valve; recording time period, fluid pressure, and consumed flow for the second valve; calculating the bulk modulus over fluid volume parameter for each valve based on the recorded data.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Certain key parameters related to control system applications need to be commissioned in associated valve assemblies to achieve premier valve performances. Compared with traditional mobile valve, certain advanced valves can provide more accurate and fast pressure control to its attachment. An example of such a valve assembly manufactured by the assignee of this application is the Eaton CMA Advanced Mobile Valve with Independent Metering (e.g. models CMA 90, CMA 200). A key parameter required for this control is the "bulk modulus over the fluid volume." Theoretically, this parameter varies in real time during operations. The bulk modulus depends on the air entrained content and the operating pressure, and the fluid volume varies as the actuator moves. However, if the volume change caused by the actuator's movement is much smaller compared with the dead volume (such as hose, fitting, dead volume in the actuator), it is safe to approximate this parameter (bulk modulus over volume) with a constant for controller design purpose. This constant is calibrated at its nominal operating condition. Directly measuring this parameter at its nominal operating condition is challenging. Therefore, an automatic detect approach is preferred to commission this parameter in the field.

Descriptions of the system in general, the hydraulic system, the related control systems, and the aforementioned auto-commissioning methods follow.

General System Description

Figure 1:
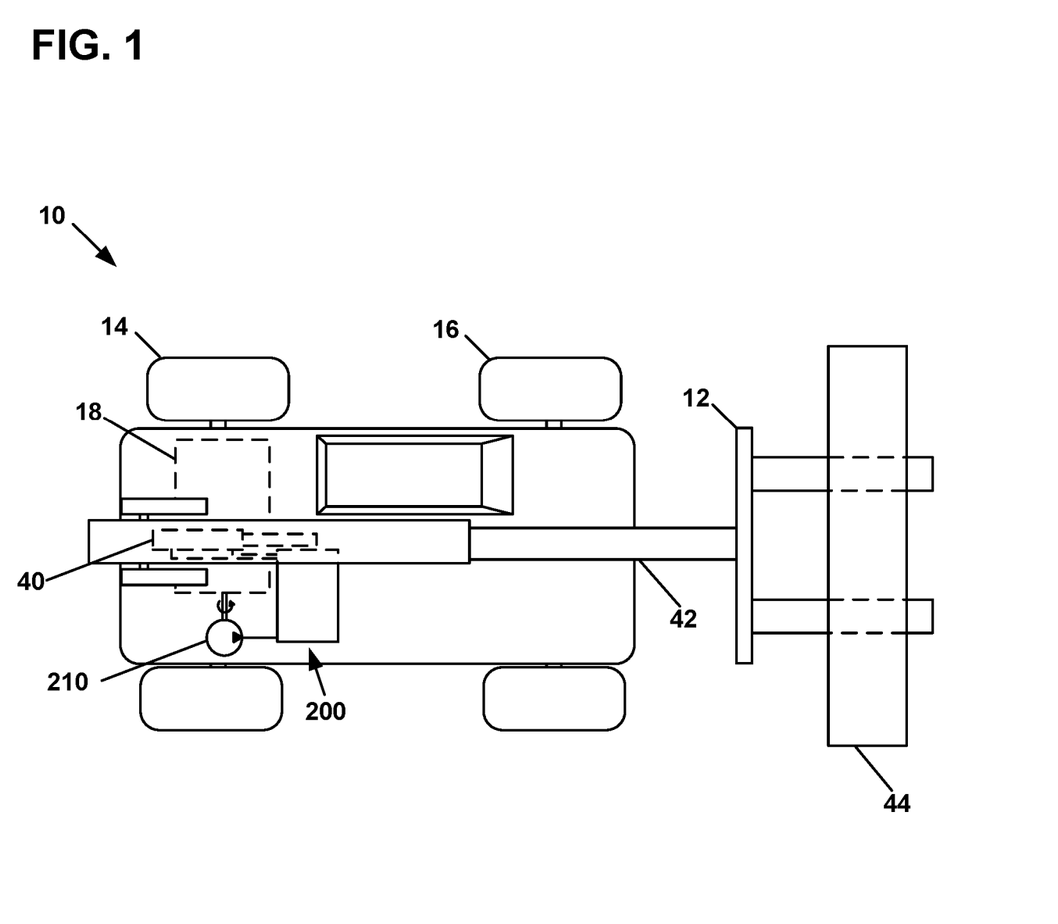
FIG. 1 is a schematic view of a work machine having features that are examples of aspects in accordance with the principles of the present disclosure.

As depicted at FIG. 1, a work machine 10 is shown. Work machine 10 includes a work attachment 12 for performing a variety of lifting tasks associated with a load 44. In one embodiment, work machine 10 is a telehandler having a telescoping boom 42 that supports the work attachment 12. In one embodiment, the work attachment 12 includes a pair of forks. However, one skilled in the art will appreciate that work attachment may be any hydraulically powered work implement.

Work machine 10 is also shown as including at least one drive wheel 14 and at least one steer wheel 16. In certain embodiments, one or more drive wheels 14 may be combined with one or more steer wheels 16. The drive wheels are powered by an engine 18. Engine 18 is also configured to power a hydraulic system including a work circuit 200 and a steering circuit (not shown) of the work machine 10 via at least one hydraulic pump 210. In one embodiment, pump 32 is mechanically coupled to the engine 18, such as by an output shaft or a power take-off. In one embodiment, pump 32 is powered indirectly by the engine 18 via a hydraulic system. The work circuit 200 actuates the work attachment 12 by operation of the pump in cooperation with a number of hydraulic actuators 40 and control valves 20, 120. In one embodiment, the work machine includes hydraulic actuators and valves for effectuating lifting, extending, tilting, and sideways motions of the work attachment 12.

Hydraulic System

Figure 2:
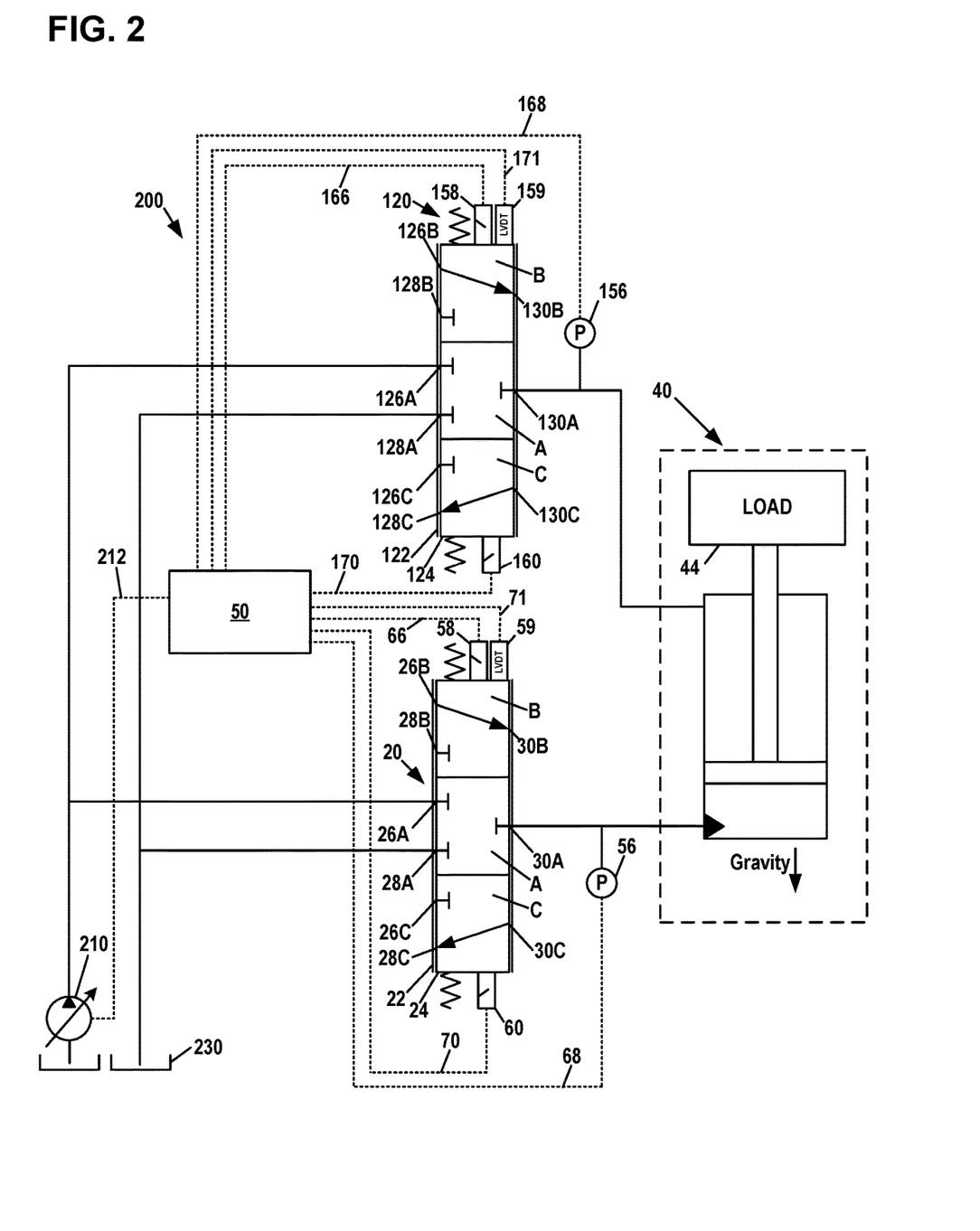
FIG. 2 is a schematic view of a portion of an electro-hydraulic system including a work circuit and actuator suitable for use in the work machine shown in FIG. 1.

Referring to FIG. 2, an example of a hydraulic system including a work circuit 200 and other components are shown. Work circuit 200 is for activating a work attachment of a work machine. As shown, work circuit 200 includes a first valve assembly 20 and a second valve assembly 120 for enabling a work function, such as an attachment lift function. Work circuit 200 may also include a plurality of additional valves and/or fluid power consuming components for enabling other functions in the hydraulic system. Furthermore, the work circuit may include a single valve assembly that combines the functions of the first and second valve assemblies 20, 120. In the particular embodiment shown, the first and second valve assemblies 20, 120 are proportional valves having a sleeve 22, 122 within which a spool 24, 124 is disposed.

Figure 2A:
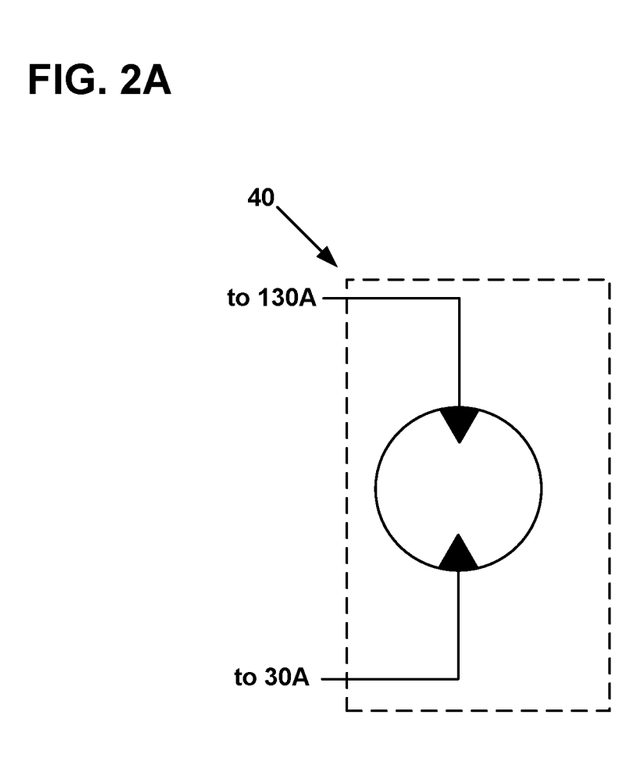
FIG. 2A is a schematic of a hydraulic motor usable within the system shown in FIG. 2.

The first valve assembly 20 is configured and arranged to selectively provide pressurized fluid from pump 210 to one or more actuators 40 are shown. In the particular example presented, the actuator 40 is a hydraulic lift or work cylinder 40 mechanically coupled to the work attachment. Although cylinders 40 are characterized in this disclosure as being lift cylinders, it should be understood that cylinders 40 may be any type of work cylinder, and that the disclosure is not limited to only applications involving lift cylinders. Additionally, any type of actuator or combinations thereof may be used, for example, linear hydraulic actuators and motors. An example of a hydraulic actuator 40 that is a motor 40 usable with the disclosed concepts herein is presented at FIG. 2A. The operation of first valve assembly 20 causes the work attachment 12 to be selectively raised or lowered in a lifting function. The lifting speed of the lift cylinder(s) 40 is a result of the flow through the first valve assembly 20. Flow through the first valve assembly 20 can be controlled by a pair of variable solenoid actuators 58, 60 acting on each end of the spool 24 of the valve 20. The variable solenoid actuators 58, 60 can be operated by the control system 50 via control lines 66, 70, respectively. Additionally where solenoids or solenoid actuators are referenced in the application, it should be noted that the associated valves could be voicecoil driven valves. Additionally, multi-stage valves incorporating a main stage valve that is pilot operated by valves utilizing solenoids and/or voicecoils may be used.

As shown, the first valve assembly 20 is a three-position, three-way valve in fluid communication with the pump 210, a tank reservoir 230, and the lift cylinder(s) 40. In the embodiment shown, first valve assembly 20 is movable from a closed or neutral position A, to a lifting position B, and to a lowering position C.

In the closed position A, ports 26A, 28A, and 30A are closed such that the pump 210 and tank reservoir 230 are both isolated from the lifting cylinder(s) 40. In this position the work attachment 12 is held in a static position and can be neither raised nor lowered.

In the lifting position B, the first valve assembly 20 is positioned such that ports 26B and 30B are placed in fluid communication with each other. This position allows for the pump 210 to be placed in fluid communication with the lifting cylinder(s) 40. Where the pump pressure exceeds the pressure induced by a load 44, the hydraulic lift cylinder(s) will cause the load 44 to be raised. In the lifting position, the tank reservoir 230 is blocked at port 28B.

In the lowering position C, the first valve assembly 20 is positioned such that ports 28C and 30C are placed in fluid communication with each other. This position allows for the tank reservoir 230 to be placed in fluid communication with the lifting cylinder(s) 40. The lowering position C allows for fluid to drain from the lifting cylinder(s) 40 to the tank reservoir 230, thereby allowing for the load 44 to be lowered.

The second valve assembly 120 is configured and arranged to selectively provide fluid communication between the pump 210 or reservoir 230 and one or more hydraulic lift or work cylinders 40 which are mechanically coupled to the work attachment. The operation of second valve assembly 120 allows for hydraulic fluid to cause the work attachment 12 to be selectively raised or lowered in a lifting function. The lowering speed of the lift cylinder(s) 40 can be a result of the flow through the second valve assembly 120. Flow through the second valve assembly 120 can be controlled by a pair of variable solenoid or voicecoil actuators 158, 160 acting on each end of the spool 124 of the valve 120. The variable solenoid or voicecoil actuators 158, 160 can be operated by the control system 50 via control lines 166, 170, respectively.

As shown, the second valve assembly 120 is a three-position, three-way valve in fluid communication with the pump 210, a tank reservoir 230, and the lift cylinder(s) 40. In the embodiment shown, second valve assembly 120 is movable from a closed or neutral position A, to a position B, and to position C. Positions B and C could be used for lifting or lowering, depending upon whether pump pressure is needed to prevent cavitation and whether the tank pressure is sufficient. In one embodiment, position B is typically used for lowering.

In the closed position A, ports 126A, 128A, and 130A of the second valve assembly 120 are closed such that the pump 210 and tank reservoir 230 are both isolated from the lifting cylinder(s) 40. In this position the work attachment 12 can generally be held in a static position and can be neither raised nor lowered. However, it the work attachment 12 could lower to some extent if the gravity load is such that a sufficient vacuum condition would be created. In one operational control scheme, the second valve assembly 120 would be in the closed position A when the first valve assembly 20 is also in its closed position A.

In the lowering position B, the second valve assembly 120 is positioned such that ports 126B and 130B are placed in fluid communication with each other. This position allows for the pump 210 to be placed in fluid communication with the lifting cylinder(s) 40 such that pump can provide fluid power to lower the load beyond what would be achieved by gravity alone. In the lowering position, the tank reservoir 230 is blocked at port 28B. In one operational control scheme, the second valve assembly 120 would be in the lowering position B when the first valve assembly 20 is also in its lowering position C.

In the lifting position C, the second valve assembly 120 is positioned such that ports 128C and 130C are placed in fluid communication with each other. This position allows for the tank reservoir 230 to be placed in fluid communication with the lifting cylinder(s) 40. The lifting position C allows for fluid to drain from the rod side of the lifting cylinder(s) 40 to the tank reservoir 230, thereby allowing for the load 44 to be raised. In one operational control scheme, the second valve assembly 120 would be in the lifting position C when the first valve assembly 20 is also in its lifting position B.

It is noted that the work machine 10 and work circuit 200 may contain a plurality of work sections, each of which including an actuator 40 and valves 20, 120 for performing various tasks of the work machine (e.g. lifting, side shift, tilt, etc.). In some examples, the valves 20, 120 are packaged together in a single housing assembly. In some examples, multiple housing assemblies are assembled together such that all of the valves associated with the work sections are provided as an overall assembly, as is the case for some models of the Eaton CMA Advanced Mobile Valve.

The Electronic Control System

The hydraulic system operates in various modes depending on demands placed on the work machine (e.g., by an operator). The electronic control system monitors and allows for the various modes to be initiated at appropriate times.

An electronic controller 50 monitors various sensors and operating parameters of the hydraulic system 214 to configure the hydraulic system 214 into the most appropriate mode. Examples of operational modes are a work circuit lifting mode and a fail operational mode.

Figure 3:
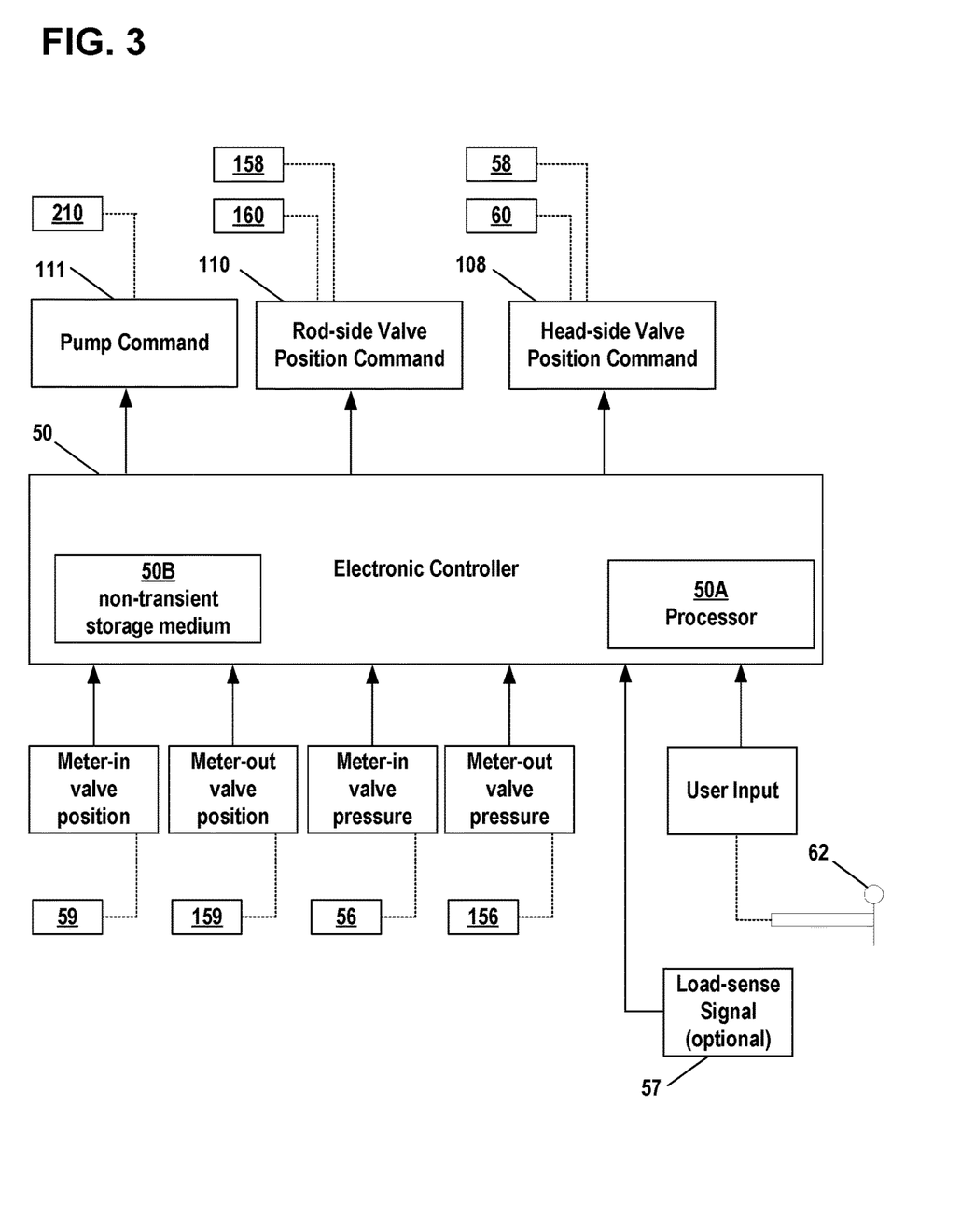
FIG. 3 is a schematic of an electronic control system for the hydraulic circuit shown in FIG. 2.

Referring to FIG. 3, the electronic controller 50 is schematically shown as including a processor 50A and a non-transient storage medium or memory 50B, such as RAM, flash drive or a hard drive. Memory 50B is for storing executable code, the operating parameters, the input from the operator interface while processor 50A is for executing the code.

Electronic controller 50 may have a number of inputs and outputs that may be used for implementing the work circuit lifting mode and the work circuit fail operational mode. For example, inputs and outputs may be in the form of pressure and position sensors on the first and second control valves 20, 120. Another example of an input is engine speed, which may be provided as a direct input into the electronic controller 50 or may be received from another portion of the control system via a control area network (CAN). The measured pump displacement, for example via a displacement feedback sensor, may also be provided.

One input into the electronic controller 50 is the lever position input from a lifting lever 62. In one embodiment, the lever position input is a direct digital signal from an electronic lever. The lifting lever 62 provides a user indication to the controller 50 that a load lifting operation by hydraulic lift cylinder(s) 40 is desired and also provides a means to control the raising and lowering of the load 44. Although lever 62 is characterized as a lifting lever, it should be understood that the disclosure is not limited to only lifting levers and that lever 62 can be any type of work lever without departing from the concepts disclosed herein. Other inputs to the controller are the signals from sensors 56, 59, 156, and 159. An optional load-sense signal 57 may also be provided to the controller or directly to the pump 210. In the embodiment shown, the load-sense demand is derived from the pressure sensors. The pressure and position inputs can also be used by the valve controller to calculate a flow rate through the valve itself.

Still referring to FIG. 3, a number of outputs from the electronic controller 50 are shown. One output is a valve position command 108 to the first control valve 20. In the particular embodiment shown, the valve command output 108 is a proportional signal to the solenoid or voicecoil valves 58, 60 of control valve 20 via control lines 66, 70. Another output is a valve position command 110 to the second control valve 120. In the particular embodiment shown, the valve command output 110 is a proportional signal to the solenoid or voicecoil valves 158, 160 of control valve 120 via control lines 166, 170. Another output may be a pump command output 111 to control the flow and/or pressure generated by the pump 210.

The electronic controller 50 may also include a number of algorithms or control schemes to correlate the inputs and outputs of the controller 502. In one embodiment, the controller 50 includes an algorithm to control the system in a work mode, as described further in the Method of Operation section below.

The electronic controller 50 may also store a number of predefined and/or configurable parameters and offsets for determining when each of the modes is to be initiated and/or terminated. As used herein, the term "configurable" refers to a parameter or offset value that can either be selected in the controller (i.e. via a dipswitch) or that can be adjusted within the controller.

Method of Operation

In general, during normal operation, one of the valves is placed in a flow control mode and the other valve is placed in a pressure control mode. In one example, the meter-in side operates in a flow control mode to control the motion of the actuator, and the meter-out side operates in a pressure control mode to guarantee a low meter out pressure. The meter-in and meter-out valves can be controlled in other modes as well without departing from the concepts herein. The meter-in valve is the valve from which fluid is being fed through the valve and to the actuator while the meter-out valve is the valve to which fluid flows from the opposite side of the actuator. The valves switch between these two designations depending upon the desired directional control of the actuator. By use of the term "flow control mode" it is meant to indicate that the valve is controlled to maintain a fluid flow setpoint. By use of the term "pressure control mode" it is meant to indicate that the valve is controlled to maintain a fluid pressure setpoint. By use of the term "passive condition" it is meant to indicate that the load is being forced in a direction by the actuator that is generally opposite the direction of an external opposing force, such as gravity (e.g. such as when a load is being lifted).

Figure 4:
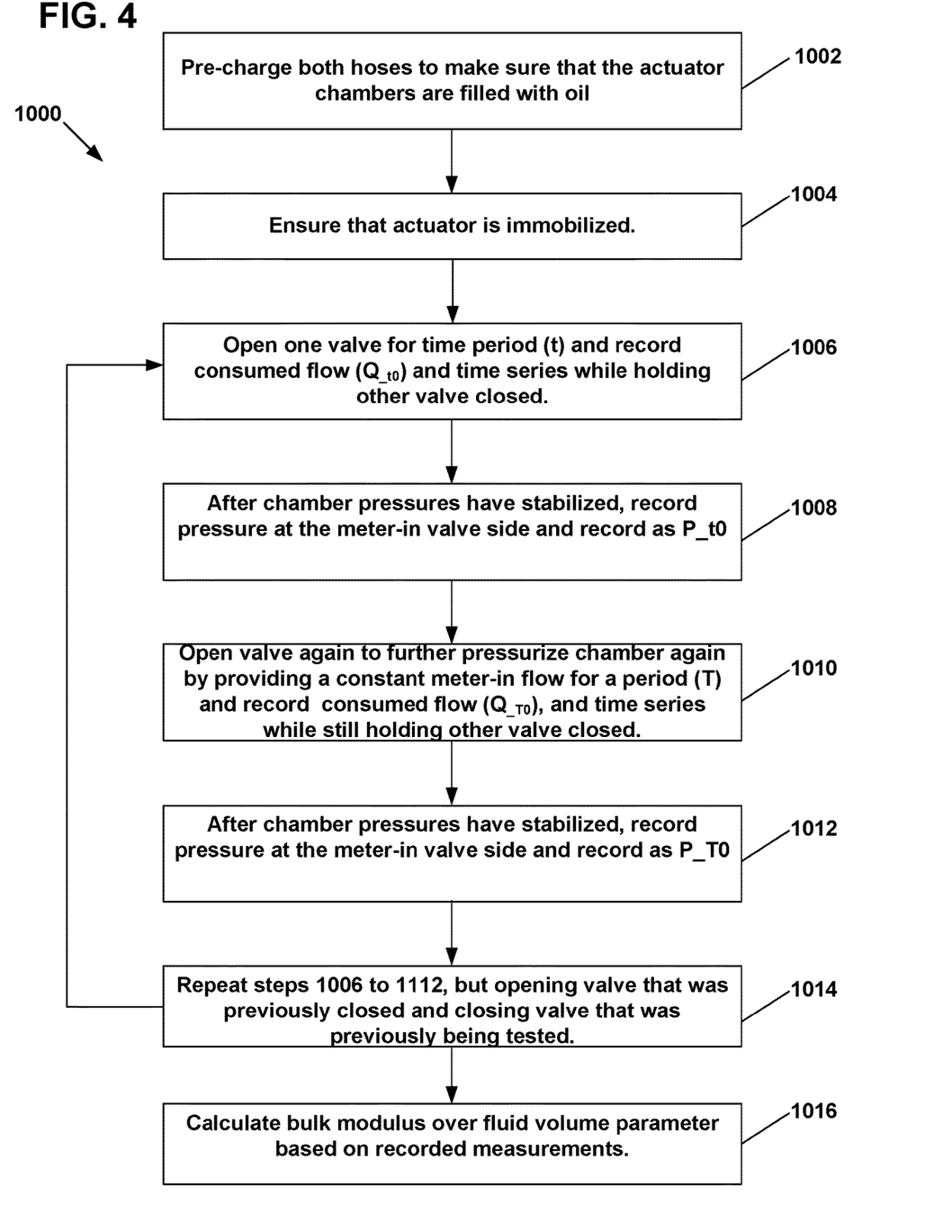
FIG. 4 is a flow chart showing a process for determining the bulk modulus over fluid volume parameter for the system shown in FIG. 2.

Referring to FIG. 4, an automatic commissioning test 1000 for determining the bulk modulus over fluid volume parameter is presented. This automatic determination can reduce set-up time and can allow for the attachment of unknown implements to the valve without requiring operator input. Additionally, these methods can also reduce set-up time for a new replacement valve being installed in an existing system. Accurately determining the bulk modulus over fluid volume parameter, which is assumed to be constant, for each valve allows the valve to more accurately operate when in the pressure control mode. In general, the algorithm determines the work port fluid volume from relative changes in pressures and consumed flow, wherein the key parameter in the controller that includes bulk modulus over fluid volume parameter can be expressed as:

$$\dot{P} = \frac{\beta}{V}(Q_{valve} - A\dot{x}) \quad \text{[Equation 1]}$$

In the above equation, $$\frac{\beta}{V}$$

is the bulk modulus over fluid volume parameter, wherein $\beta$ is the bulk modulus of the fluid and V between and including the actuator and valve. $Q_{valve}$ is the valve fluid flow and $A\dot{x}$ is the actuator area multiplied by the rate of displacement of the valve.

Figure 5:
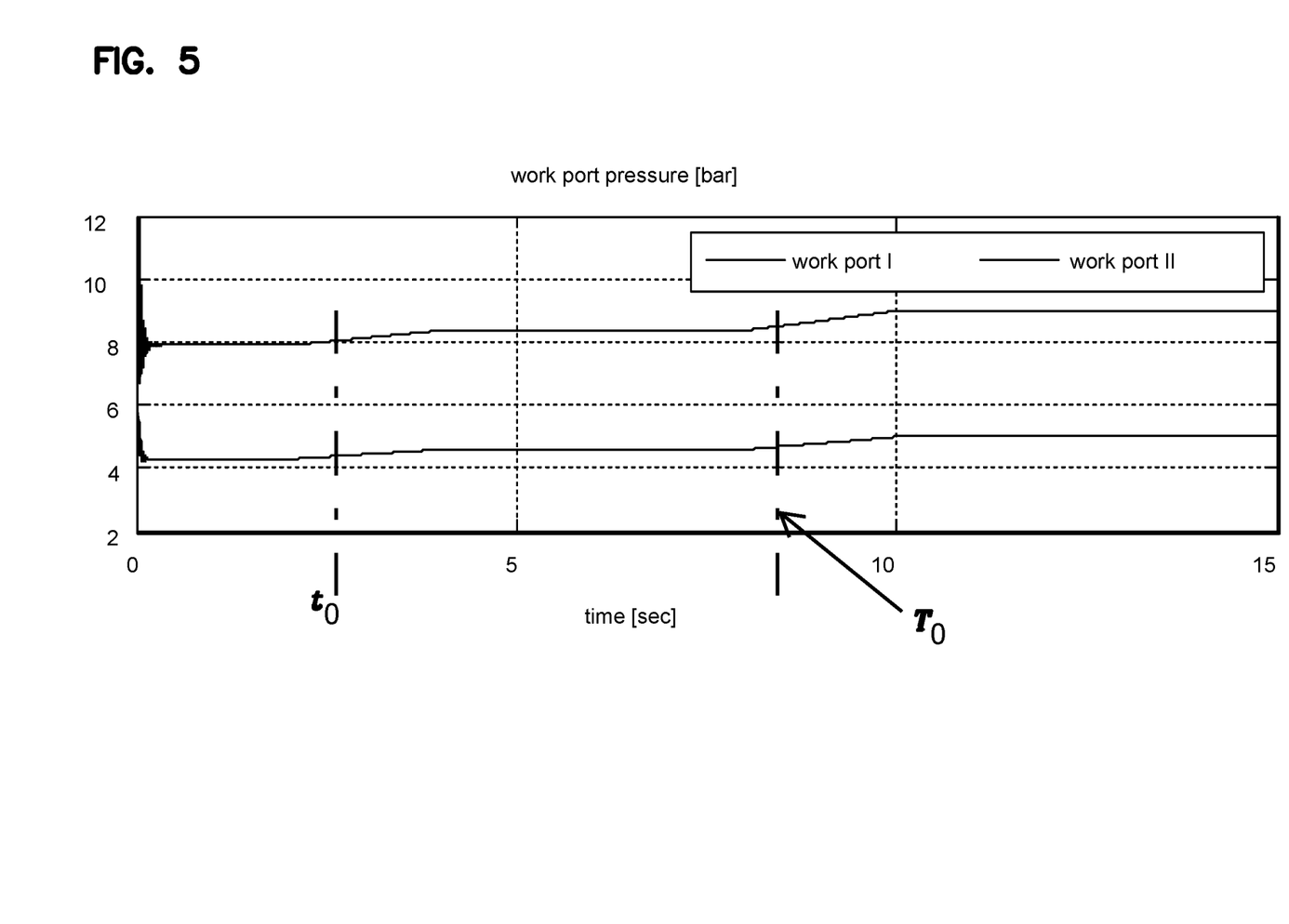
FIG. 5 is a graphical representation of the work port pressure on each side of the actuator during a simulation using the method of FIG. 4.
Figure 6:
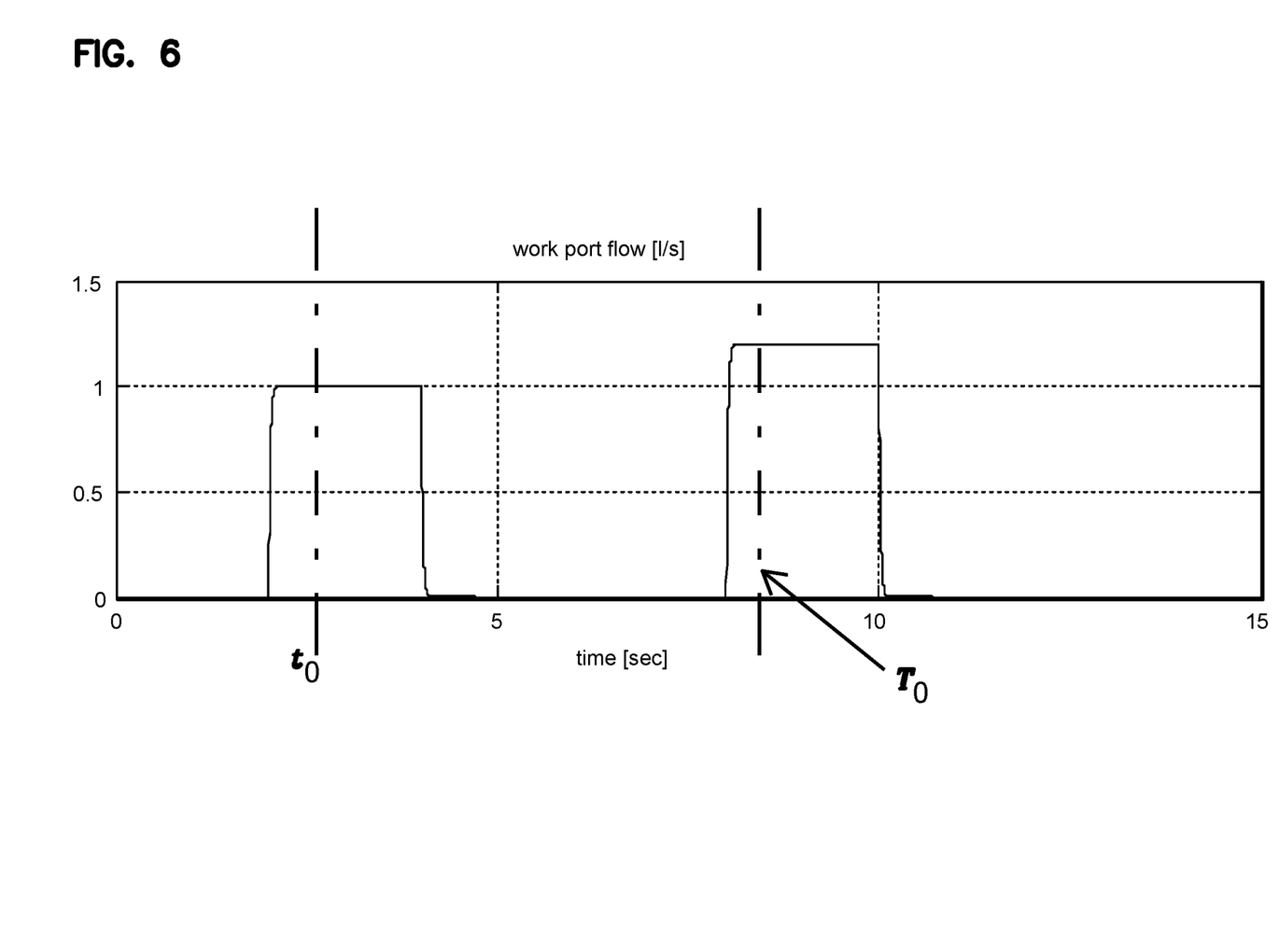
FIG. 6 is a graphical representation of the work port flow on each side of the actuator during a simulation using the method of FIG. 4.

In a step 1002 of the method 1000, the hoses on each side of the actuator are charged to ensure that the cylinder chamber is filled with oil. In a step 1004, the actuator is secured to a static position such that no significant service movement is possible, although some movement due to fluid compressibility may be experienced. This can be accomplished by closing one of the valves associated with the actuator. In a step 1006, one side of the actuator is pressurized to a first pressure while the other side of the actuator is held blocked. For example, valve 20 is placed in a closed position, while valve 120 is opened for a period of time (t) to increase the fluid pressure in the actuator, or vice-versa, and the time series and consumed flow $Q_{1t0}$ are recorded. The period of time (t) can be a predetermined period of time (e.g. about two seconds) that is sufficient to allows for the fluid to stabilize to remove any transition response, or can be the resultant time required to reach a predetermined pressure setpoint or differential. In a step 1008, after the actuator chamber pressure has stabilized (i.e. work port pressure is constant), the pressure measured at the meter-in valve is recorded as $P_{1t0}$. Measurements from sensors 56 or 156 can be used for this purpose, depending on which valve is being used as the meter-in valve. In a step 1010, the actuator is pressurized to a second pressure by opening the meter-in valve again for a period of time (T), while still holding the valve on the other side closed to block that side of the actuator. The period of time (T) can be a predetermined period of time (e.g. about two seconds) that is sufficient to allows for the fluid to stabilize to remove any transition response, or can be the resultant time required to reach a predetermined pressure setpoint or differential. Consumed flow $Q_{1T0}$ is recorded. At step 1012, after the actuator chamber pressure has stabilized, the pressure on the meter-in side of the actuator is again recorded as $P_{1T0}$. At each of steps 1004 and 1008, it should be ensured that the actuator has not been moved to an end stop. Where the pressure on one side of the actuator does not rise during the test, it may be an indication that this has occurred. After this step, the process repeats steps 1006 to 1112 but switching the roles of the valves. For example, if valve 20 was held closed during the first run through steps 1006 to 1112, then it would become the valve that is opened while valve 120 would become the constantly closed valve. Resultant recordings from the second run through the steps would be $Q_{2t0}$, $Q_{2T0}$, $P_{2t0}$, and $P_{2T0}$. Referring to FIGS. 5 and 6, a graphical output from a model simulation is shown that illustrates the work port pressures and flows for each side of the actuator, when following steps 1004 to 1014 of method 1000.

At step 1016, the bulk modulus over fluid volume for each side of the actuator, $$\frac{\beta}{V_1} \text{ and } \frac{\beta}{V_2}$$

can be calculated based on $Q_{1t0}$, $Q_{1T0}$, $Q_{2t0}$, $Q_{2T0}$, $P_{1t0}$, $P_{1T0}$, $P_{2t0}$, $P_{2T0}$. The recorded pressure and flow data at each time period of the method can be used in Equation 1 above, after integrating both sides of the equation, to establish the following relations:

$$\frac{V_1}{\beta}P_{1t0} = Q_{1t0} - A_1 x_{t0} \quad \text{[Equation 2a]}$$

$$\frac{V_1}{\beta}P_{1T0} = Q_{1T0} - A_1 x_{T0} \quad \text{[Equation 2b]}$$

$$\frac{V_2}{\beta}P_{2t0} = Q_{2t0} - A_2 x_{t0} \quad \text{[Equation 2c]}$$

$$\frac{V_2}{\beta}P_{2T0} = Q_{2T0} - A_2 x_{T0} \quad \text{[Equation 2d]}$$

By integrating Equation 1, the following variables can be defined that are used in the above Equations 2a to 2d:

$$P_{1t0} = P_1(t) - P_1(t_{10})$$

$$Q_{1t0} = \int_{t10}^{t} Q_1(t) dt$$

$$x_{t0} = x(t) - x(t_0)$$

Similar definitions apply the blocked side for $P_2$, $Q_2$

Equations 2a to 2d can be reorganized into the following matrix:

$$\underbrace{\begin{bmatrix} P_{1t0} & 0 & A_1 & 0 \\ P_{1T0} & 0 & 0 & A_1 \\ 0 & P_{2t0} & A_2 & 0 \\ 0 & P_{2T0} & 0 & A_2 \end{bmatrix}}_{\Lambda} \begin{bmatrix} V_1/\beta \\ V_2/\beta \\ x_{t0} \\ x_{T0} \end{bmatrix} = \begin{bmatrix} Q_{1t0} \\ Q_{1T0} \\ Q_{2t0} \\ Q_{2T0} \end{bmatrix}$$

Figure 7:
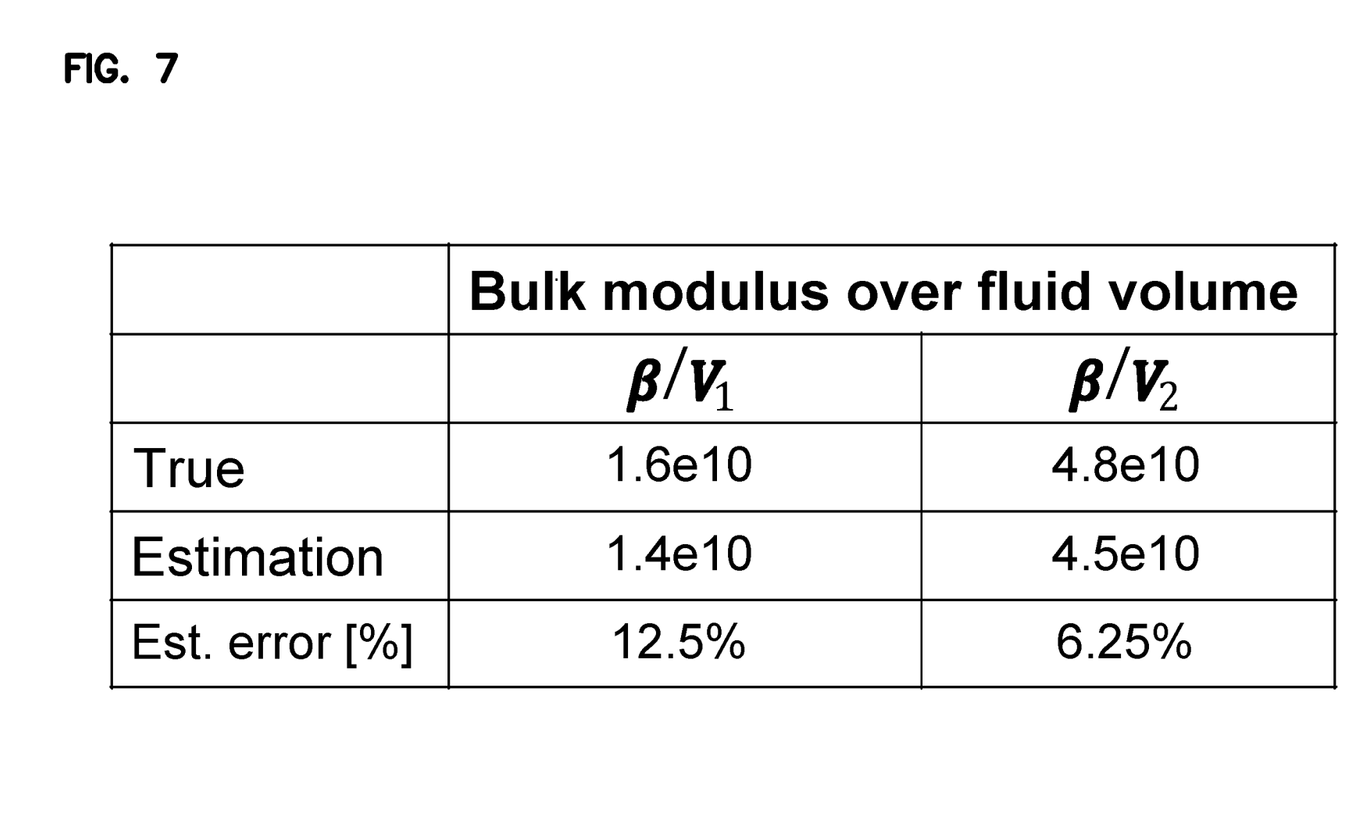
FIG. 7 is a table showing results for the bulk modulus over fluid volume estimation process shown in FIG. 4.

Whether $$\frac{V_1}{\beta} \text{ and } \frac{V_2}{\beta}$$

can be uniquely determined from the above data depends on the rank of $\Lambda$. If the determinant of $\Lambda$ is non-zero [e.g. if $A_1 A_2 (P_{1t0} P_{2T0} - P_{1T0} P_{2t0}) \neq 0$], then $\Lambda$ is invertible. If $\Lambda$ is invertible, then $$\frac{V_1}{\beta} \text{ and } \frac{V_2}{\beta}$$

can be uniquely determined from the data. Referring to the simulation results shown in FIG. 7, which are based on the data from FIGS. 5 and 6, it can be seen that the application of method 1000 results in a 12.5% estimation error for $$\frac{\beta}{V_1}$$

and a 6.25% estimation error for $$\frac{\beta}{V_2}.$$

Accordingly, method 1000 can be utilized as a reliable approach for estimating the bulk modulus over fluid volume parameter. In the above equations, $x_{t0}$ and $x_{T0}$ are solvable variables representing initial actuator positions. However, they are not needed for determining the bulk modulus over fluid volume parameters.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for determining a bulk modulus over fluid volume parameter for a valve controller, the method comprising the steps of:
   a. providing first and second valve assemblies in fluid communication with a hydraulic actuator;
   b. pressurizing each side of the actuator to two different pressures with one of the first and second valve assemblies and blocking the other side of the actuator with the other of the first and second valve assemblies; and
   c. calculating the bulk modulus over fluid volume parameter for the first and second valves.

2. The method for determining a bulk modulus over fluid volume parameter of claim 1, wherein the pressurizing step includes pressurizing a first side of the actuator with the first valve assembly to a first pressure and then to a second pressure while the second valve assembly is closed, and includes pressurizing a second side of the actuator with the second valve assembly to a third pressure and then to a fourth pressure while the first valve assembly is closed.

3. The method for determining a bulk modulus over fluid volume parameter of claim 2, further including the steps of recording the first, second, third, and fourth pressures.

4. The method for determining a bulk modulus over fluid volume parameter of claim 3, further including the steps of recording a first consumed flow associated with the first valve assembly and first pressure, recording a second consumed flow associated with the first valve assembly and second pressure, recording a third consumed flow associated with the second valve assembly and third pressure, and recording a fourth consumed flow associated with the second valve assembly and fourth pressure.

5. The method for determining a bulk modulus over fluid volume parameter of claim 4, wherein the calculating step is a function of the first through fourth pressures and the first through fourth consumed flows.

6. The method for determining a bulk modulus over fluid volume parameter of claim 5, wherein the pressurizing step includes a first pressurization step in which the second valve assembly is held closed and the first valve assembly is opened for a first predetermined period of time and then closed and includes a second pressurization step in which the second valve assembly is held closed and the first valve assembly is opened for a second predetermined period of time and then again closed.

7. The method for determining a bulk modulus over fluid volume parameter of claim 6, wherein the first and second predetermined periods of time are equal.

8. The method for determining a bulk modulus over fluid volume parameter of claim 6, wherein the pressurizing step includes a third pressurization step in which the first valve assembly is held closed and the second valve assembly is opened for a third predetermined period of time and then closed and includes a fourth pressurization step in which the first valve assembly is held closed and the second valve assembly is opened for a fourth predetermined period of time and then again closed.

9. The method for determining a bulk modulus over fluid volume parameter of claim 6, wherein the first, second, third, and fourth predetermined periods of time are equal.

10. The method for determining a bulk modulus over fluid volume parameter of claim 1, wherein the first and second valve assemblies are spool and sleeve type valve assemblies.

11. The method for determining a bulk modulus over fluid volume parameter of claim 1, wherein the actuator is a linear actuator.

12. The method for determining a bulk modulus over fluid volume parameter of claim 1, wherein the calculating step is performed during a commissioning process of the valve assembly.

13. The method for determining a bulk modulus over fluid volume parameter of claim 1, further comprising storing the bulk modulus over volume parameter as a constant in a controller associated with the first and second valve assemblies.

* * * * *